United States Patent [19]

Mai et al.

[11] Patent Number: 4,844,925
[45] Date of Patent: Jul. 4, 1989

[54] PROCESS FOR INHIBITING FORMATION OF N-NITROSAMINES IN A NITRITE-CURED FOOD PRODUCT

[75] Inventors: Jimbin Mai, New Milford; Richard E. McDonald, Brookfield Center; Elaine R. Wedral, Brookfield, all of Conn.

[73] Assignee: Nestec S.A., Vevey, Switzerland

[21] Appl. No.: 868,185

[22] Filed: May 21, 1986

Related U.S. Application Data

[63] Continuation of Ser. No. 634,210, Jul. 25, 1984, abandoned.

[51] Int. Cl.$^4$ .......................... A23B 4/14; A23L 1/314
[52] U.S. Cl. ..................... 426/266; 426/332; 426/429; 426/435; 426/641; 426/652
[58] Field of Search ............ 426/264, 265, 266, 332, 426/641, 652, 655, 429, 435, 646, 262, 268

[56] References Cited

U.S. PATENT DOCUMENTS

| | | | |
|---|---|---|---|
| 699,979 | 5/1902 | Rom | 426/332 |
| 2,085,489 | 6/1937 | Baruth | 426/429 X |
| 2,933,399 | 4/1960 | Nickerson et al. | 426/652 X |
| 3,873,752 | 3/1975 | Reymond et al. | 426/655 X |
| 3,950,553 | 4/1976 | Gasser et al. | 426/435 X |
| 4,004,038 | 1/1977 | Wickremasinghe | 426/422 |

FOREIGN PATENT DOCUMENTS

| | | | |
|---|---|---|---|
| 1492754 | 11/1970 | Fed. Rep. of Germany | 426/435 |
| 39058 | 11/1971 | Japan | 426/332 |
| 857517 | 12/1960 | United Kingdom | 426/435 |
| 2085274 | 8/1982 | United Kingdom | |

OTHER PUBLICATIONS

"Inhibitory Effects of Phenolics, Teas and Saliva on the Formation of Mutagenic Nitrogation Products of Salted Fish", Int. J. Cancer:30, 719–724 (1982), Stich, et al.

*Primary Examiner*—Arthur L. Corbin
*Attorney, Agent, or Firm*—Vogt & O'Donnell

[57] ABSTRACT

A process for inhibiting formation of N-nitrosamines in a nitrite cured food product wherein an extract formed by the aqueous extraction of black tea leaves at a temperature from 120° C. to 210° C. is incorporated in the food product, the amount of extract being such that the content of tea solids present is from 0.005% to 1.5% by weight based on the weight of food, said extract containing at least 5% by weight of phenol compounds based on the weight of tea solids therein.

19 Claims, No Drawings

PROCESS FOR INHIBITING FORMATION OF N-NITROSAMINES IN A NITRITE-CURED FOOD PRODUCT

This is a continuation of application Ser. No. 06/634,210, filed on July 25, 1984, now abandoned.

BACKGROUND OF THE INVENTIONS

The present invention relates to the inhibition of the formation of N-nitrosamines in nitrite cured food products, more particularly to compositions comprising nitrite cured food products and certain tea extracts obtained by the extraction of tea leaves at temperatures of at least 120° C.

Nitrates and nitrites have been used for a long time in the preservation of foods and even now nitrites are the most effective agents in preventing Botulinum in cured meats. However, nitrites react with secondary amines to form N-nitrosamines which are considered as potential carcinogens to consumers. International concern over the presence of nitroso compounds in foods and their formation within the alimentary system and in other parts of the environment has led not only to increasing restrictions on the use of nitrates and nitrites for food preservation but also to the search for nitrite substitutes or compounds which would inhibit the formation of N-nitrosamines. The search for nitrite substitutes has not yet been very successful but substances such as ascorbic acid (Vitamin C), $\alpha$-tocopherol (Vitamin E) and plant phenolics have been described as blocking agents to inhibit N-nitrosamine formation in cured meats.

However, a disadvantage of Vitamin C is that it is not entirely heat stable at cooking temperatures as high as 180° C. and thus loses its activity during cooking at such temperatures. In addition, a disadvantage of vitamin E is that it is not water-soluble and it is difficult to apply to cured meat in the curing brine.

SUMMARY OF THE INVENTION

We have found, surprisingly, that in the aqueous extraction of black tea leaves at temperature from 120° C. to 210° C., certain extracts are formed which have not only superior N-nitrosamine inhibiting activity to systems containing plant phenolics described in the literature but also have advantages over Vitamin C and Vitamin E in that they are heat stable at 180° C. and extremely water soluble respectively. In addition, as described in co-pending U.S. patent application Ser. No. 065,616, the tea extracts have excellent antioxidant activity.

Accordingly, the present invention provides a composition comprising a nitrite cured food product and an extract formed by the aqueous extraction of black tea leaves in a process which includes a treatment at a temperature from 120° C. to 210° C., the amount of extract being such that the content of tea solids present is from 0.005% to 1.5% by weight based on the weight of food, said extract containing at least 5% by weight of phenol compounds based on the weight of tea solids.

The present invention also provides a process for inhibiting the formation of N-nitrosamines in nitrite cured food products which comprises treating the food product with a nitrite curing mix and with an extract formed by the aqueous extraction of black tea leaves in a process which includes a treatment at a temperature from 120° C. to 210° C., the amount of extract being such that the content of tea solids present is from 0.005% to 1.5% by weight based on the weight of food, said extract containing at least 5% by weight of phenol compounds based on the weight of tea solids.

Conveniently, the tea extract is added to the nitrite curing mix before the curing process.

Food materials which may be treated in accordance with the present invention are, for example, meat products such as bacon, ham, corned beef and pepperoni sausage.

Instant tea is routinely prepared by the hot water extraction of tea leaves, for example, as described in *World Coffee and Tea*, April 1972, pages 54–57, "The practice of instant tea manufacture". In the present invention, similar extraction conditions used in instant tea manufacture are followed wherein at least part of the extraction of the tea leaves is carried out at a temperature of at least 120° C. to obtain the tea extracts which are excellent inhibitors of the formation of N-nitrosamines in nitrite cured food products. In addition to these extracts, the spent tea leaves or residues remaining after extraction and the instant tea powder are also excellent inhibitors. For convenience, the word "extract" used in this invention includes the instant tea powder, the spent tea leaves and residues after extraction. The concentrated extracts containing up to 15% tea solids, especially from 4% to 10% tea solids have especially good inhibiting activity.

DESCRIPTION OF PREFERRED EMBODIMENTS

In one particular process of making tea extract with excellent activity for inhibiting the formation of N-nitrosamines in nitrite cured food products, black tea leaves are extracted at a temperature from 80° C. to 130° C. to give an initial extract (Fraction I). The residual leaves are extracted at a temperature from 120° C. to 210° C. and centrifuged to give a second extract (Fraction II). Fraction I and Fraction II are combined and concentrated to give an approximately 5–10% tea concentrate which is cooled and the insoluble tannins separated therefrom to give a water soluble tea liquor (Fraction III). All fractions are further concentrated and dried. Preferably the tea leaves are extracted at a temperature from 100° C. to 125° C. and especially from 105° C. to 120° C., for a period from 10 minutes to 60 minutes to give the initial extract. The residual tea leaves are then milled, slurried and extracted a second time, conveniently for a period from 5 to 60 minutes, preferably from 20 to 40 minutes, at a temperature from 130° C. to 210° C., preferably from 145° C. to 195° C., more preferably from 160° C. to 185° C., and especially from 165° C. to 180° C. Advantageously, the extraction at the higher temperatures is carried out under pressure. After the second extraction the tea residue is removed, e.g. by centrifugation to yield Fraction II. In this process, Fraction II has especially good N-nitrosamine inhibiting activity.

Excellent N-nitrosamine inhibiting activity is obtained when the amount of phenol compounds is at least 6% by weight and preferably at least 8% by weight based on the weight of tea solids. Preferably the aqueous extract contains from 4% to 10% tea solids based on the weight of the extract.

The major phenolic constituents of the tea solids and the amounts of each usually present in the extracts are gallic acid (0.05 to 1.5%), epicatechin (0.01 to 0.5%), catechin (0.01 to 0.6%), epigallocatechin (0.01 to 0.75%), epicatechin gallate (0.01 to 1.00%) and epigallocatechin gallate (0.01 to 1.5%), all the amounts being given as percentages by weight based on the weight of tea solids.

The amount of extract present in the food composition of the present invention ordinarily is such that the tea solids content of the composition is from 0.005% to 1.5% by weight, and is conveniently such that the tea solids content is from 0.008 to 1.00% by weight, preferably from 0.01 to 0.75% and especially from 0.02 to 0.5% by weight based on the wight of food.

In one embodiment of the present invention, the tea extracts, especially Fraction II, may be further extracted with a water-immiscible organic solvent capable of extracting at least a part of the phenol compounds from the extracts, for example, by partitioning. Examples of such solvents are petroleum ether, pentane, diethyl ether, hexane, ethyl propionate, ethyl acetate, methyl iso-butyl ketone or halogenated hydrocarbons, such as Freons. The extracted phenol compounds may then be separated, for example, by removal of the solvent by rotary evaporation, and reconstituted with water and freeze-dried. Such extracts containing phenol compounds also have significant N-nitrosamine inhibiting activity.

EXAMPLES

The following examples further illustrate the present invention.

EXAMPLE 1

Black tea leaves were extracted at a temperature between 110° C. and 120° C. for 30 minutes to give Fraction I. The residual tea leaves were milled, slurried and then extracted at 190° C. and a pressure of 11 bars for a further 30 minutes. This slurry was centrifuged and the supernatant was recovered as Fraction II.

A first sample of ham was nitrite cured in the standard manner and used as a control. A second sample of ham was cured similarly except that an amount of Fraction II ws added to the nitrite curing mix so that the proportion of tea solids present in the second sample of cured ham was 2500 ppm (0.25%). The nitrite cured ham treated with Fraction II and the control nitrite cured ham were analysed for N-nitrosamine by GC-TEA (Thermal energy analyser). The results of the analyses are indicated in Table I.

TABLE I

| Sample | N—nitrosamines in ppb and % reduction in ( ) | | | |
|---|---|---|---|---|
| | Dimethyl nitrosamine | Diethyl nitrosamine | Dipropyl nitrosamine | Dibutyl nitrosamine |
| Control | 8.53 | 1.04 | 0.47 | 18.28 |
| Treated with Fraction II | 0.53 (−94%) | 0.00 (−100%) | Trace (−95%) | 0.88 (−95%) |

Table I clearly demonstrates that the aqueous extract of tea (Fraction II) inhibited the formation of more than 90% of the N-nitrosamines in the cured ham.

EXAMPLE 2

A sample of Fraction II formed in the process described in Example 1 was made into a 3% aqueous solution to which were added two volumes of ethyl acetate to form two immiscible layers. The organic layer was collected and the procedure of extraction was repeated twice. The pooled organic layer was rotary evaporated and the residue freeze dried to give Fraction IIA. The yield was 9%.

A sample of ham was nitrite cured in a similar manner to that described in Example 1 for the ham treated with Fraction II but in which, instead of Fraction II, an amount of Fraction IIA was added to the nitrite curing mix so that the proportion of tea solids present in the resultant cured has was 250 ppm (0.025%). The nitrite cured ham treated with Fraction IIA was analysed for N-nitrosamine by GC-TEA (thermal energy analyser). The results of the analyses together with the results for the control sample as described in Example 1 are given in Table II.

TABLE II

| Sample | N—nitrosamines in ppb and % reduction in ( ) | | | |
|---|---|---|---|---|
| | Dimethyl nitrosamine | Diethyl nitrosamine | Dipropyl nitrosamine | Dibutyl nitrosamine |
| Control | 8.53 | 1.04 | 0.47 | 18.28 |
| Treated with Fraction IIA | 6.13 (−28%) | 0.67 (−36%) | Trace (−95%) | 5.87 (−68%) |

Table II clearly demonstrates that an ethyl acetate extract of tea (Fraction IIA) significantly inhibited the formation of N-nitrosamines in cured ham.

We claim:

1. A process for inhibiting formation of N-nitrosamines in a nitrite-cured food product comprising the steps of:
   (a) extracting black tea leaves with water at a temperature of from 120° C. to 210° C.;
   (b) recovering an extract having at least 5% by weight phenol compounds based upon the weight of tea solids in the recovered extract; and
   (c) incorporating the recovered extract in a nitrite-cured food product such that the food product contains from 0.005% to 1.5% tea solids based on the weight of the food product.

2. A process for inhibiting formation of N-nitrosamines in a nitrite-cured food product comprising the steps of:
   (a) extracting black tea leaves with water at a temperature of from 120° C. to 210° C.;
   (b) recovering an extract having at least 5% phenol compounds based upon the weight of tea solids in the recovered extract; and
   (c) combining the recovered extract with a nitrite-curing mix to form a mixture and incorporating the mixture in a food product such that the food product contains from 0.005% to 1.5% tea solids based upon weight of the food product.

3. A process as claimed in claim 1 or 2 further comprising obtaining the recovered extract by subjecting the black tea leaves to an initial extraction with water at a temperature from 100° C. to 125° C. and collecting a first extract and then extracting residual leaves derived from the first extraction with water at a temperature from 130° C. to 210° C. to obtain a second extract.

4. A process as claimed in claim 3 further comprising combining the first and second extracts to obtain the recovered extract.

5. A process as claimed in claim 4 further comprising separating insoluble tannins from the recovered extract.

6. A process as claimed in claim 4 wherein the recovered extract is selected from the group consisting of dehydrated aqueous extract in the form of a powder, spent tea leaves and residues thereof.

7. A process as claimed in claim 3 further comprising obtaining the recovered extract by extracting phenol compounds from the water extracted black tea extract by contacting an aqueous solution containing at least the second extract with a water-immiscible organic solvent, separating the organic solvent from the aqueous solution and then separating and removing the phenol compounds from the organic solvent to obtain the recovered extract.

8. A process as claimed in claim 7 wherein the water-immiscible organic solvent is ethyl acetate.

9. The product of the process of claim 7.

10. A process as claimed in claim 1 or 2 further comprising obtaining the recovered extract by extracting phenol compounds from the water extracted black tea extract by contacting an aqueous solution of the black tea extract with a water-immiscible organic solvent, separating the organic solvent from the aqueous solution and then separating and removing the phenol compounds from the organic solvent to obtain the recovered extract.

11. A process according to claim 10 wherein the water-immiscible organic solvent is ethyl acetate.

12. The product of the process of claim 10.

13. A process as claimed in claim 1 or 2 further comprising separating insoluble tannins from the recovered extract.

14. A process as claimed in claim 1 or 2 wherein the black tea is extracted at a temperature of from 145° C. to 195° C.

15. A process as claimed in claim 1 or 2 wherein the recovered extract is selected from the group consisting of dehydrated aqueous extract in the form of a powder, spent tea leaves and residues thereof.

16. A process as claimed in claim 1 or 2 wherein the water extracted black tea extract contains from 4% to 10% tea solids by weight based upon the weight of the extract.

17. The product of the process of claim 1 or 2.

18. A process as claimed in claim 1 or 2 wherein the food product is a meat product.

19. A process as claimed in claim 1 or 2 wherein the food product is ham.

* * * * *